United States Patent [19]

Liu et al.

[11] Patent Number: 5,680,482

[45] Date of Patent: Oct. 21, 1997

[54] METHOD AND APPARATUS FOR IMPROVED VIDEO DECOMPRESSION BY ADAPTIVE SELECTION OF VIDEO INPUT BUFFER PARAMETERS

[75] Inventors: Yi Liu; Michael R. Tucker; Geoffrey S. Strongin, all of Austin, Tex.

[73] Assignee: Advanced Micro Devices, Inc., Sunnyvale, Calif.

[21] Appl. No.: 443,206

[22] Filed: May 17, 1995

[51] Int. Cl.$^6$ .................... G06K 9/30; H04N 7/12
[52] U.S. Cl. .................... 382/233; 382/235; 382/232; 348/426
[58] Field of Search .................... 382/233, 236, 382/303, 304, 235; 348/402, 426; 358/427, 433

[56] References Cited

U.S. PATENT DOCUMENTS

| | | | |
|---|---|---|---|
| 5,144,424 | 9/1992 | Savatier | 358/133 |
| 5,227,878 | 7/1993 | Puri et al. | 358/136 |
| 5,247,363 | 9/1993 | Sun et al. | 358/167 |
| 5,289,577 | 2/1994 | Gonzales et al. | 395/163 |
| 5,315,670 | 5/1994 | Shapiro | 382/56 |
| 5,347,308 | 9/1994 | Wai | 348/394 |
| 5,353,062 | 10/1994 | Maeda | 348/412 |
| 5,357,282 | 10/1994 | Lee | 348/403 |
| 5,371,547 | 12/1994 | Siracusa et al. | 348/426 |
| 5,371,611 | 12/1994 | Kato et al. | 358/456 |
| 5,386,232 | 1/1995 | Golin et al. | 348/396 |
| 5,450,599 | 9/1995 | Horvath et al. | 395/800 |
| 5,452,104 | 9/1995 | Lee | 358/433 |
| 5,481,364 | 1/1996 | Ito | 358/261.1 |
| 5,489,944 | 2/1996 | Jo | 348/405 |
| 5,502,493 | 3/1996 | Meyer | 348/426 |
| 5,510,840 | 4/1996 | Yonemitsu et al. | 348/402 |
| 5,523,847 | 6/1996 | Feig et al. | 358/261.3 |
| 5,543,846 | 8/1996 | Yagasaki | 348/415 |
| 5,559,557 | 9/1996 | Kato | 348/405 |

OTHER PUBLICATIONS

Dr. Richard Baker, "Standards Dominate Videoconferencing Implementations", Computer Design, Dec. 1994, pp. 66–70.

Stephen Ohr, "Digital Video Spearheads TV and Videoconferencing Applications", Computer Design, Dec. 1994, pp. 59–64.

Lawrence A. Rowe, et al., "MPEG Video in Software: Representation, Transmission, and Playback", High Speed Networking and Multimedia Computing, Symp. on Elec. Imaging Sci. & Tech., San Jose, CA, Feb., 1994, pp. 1–11.

Peng H. Ang, et al., "Video Compression Makes Big Gains", IEEE Spectrum, Oct. 1991, pp. 16–19.

Andy C. Hung, et al, "A Comparison of Fast Inverse Discrete Cosine Transform Algorithms", Multimedia Systems, ©1994, pp. 204–217.

P1180/D1, "Draft Standard Specification for the Implementations of 8×8 Inverse Discrete Cosine Transform", May 29, 1990, pp. 1–9.

ISO/IEC 11172-1, "Information Technology–Coding of Moving Pictures and Associated Audio for Digital Storage Media at up to about 1.5 Mbit/s"—Part 1: Systems, Aug. 1, 1993, pp. i–vi, 1–53.

(List continued on next page.)

*Primary Examiner*—Leo Boudreau
*Assistant Examiner*—Monica S. Davis
*Attorney, Agent, or Firm*—Skjerven, Morrill, MacPherson, Franklin & Friel; Ken J. Koestner

[57] ABSTRACT

A video decompression system utilizes multiple independent input buffers so that input/output operations and processing take place concurrently, nearly continuously and at a rate that is substantially equal to a selected maximum access rate of the storage device. Consequently, the data rate of the video decompression system is optimized with respect to the rate of data accessing. The video decompression system adaptively sets input buffer parameters as a function, for example, of processor capabilities, bitstream characteristics, drive latency and access time, and file I/O overhead.

15 Claims, 7 Drawing Sheets

OTHER PUBLICATIONS

ISO/IEC 11172-2, "Information Technology–Coding of Moving Pictures and Associated Audio for Digital Storage Media at up to about 1,5 Mbit/s"—Part 1: Video, Aug. 1, 1993, pp. i–ix, 1–112.

ISO/IEC 11172-3, "Information Technology–Coding of Moving Pictures and Associated Audio for Digital Storage Media at up to about 1,5 Mbit/s"—Part 1: Audio, Aug. 1, 1993, pp. i–vi, 1–150.

Kevin L. Gong, et al., "Parallel MPEG–1 Video Encoding", Report, University of California, Berkeley, Computer Science Division, 1994, pp. 1–14.

METHOD AND APPARATUS FOR IMPROVED VIDEO DECOMPRESSION BY ADAPTIVE SELECTION OF VIDEO INPUT BUFFER PARAMETERS

FIELD OF THE INVENTION

The present invention relates to decompression of video information and, more particularly, to improved performance of video decompression by adaptive selection of input buffer characteristics.

BACKGROUND OF THE INVENTION

Video information requires a large amount of storage space, therefore video information is generally compressed before it is stored. Accordingly, to display compressed video information which is stored, for example, on a compact disk read only memory (CD ROM), the compressed video information is decompressed to furnish decompressed video information. The decompressed video information is then communicated in a bit stream to a display. The bit stream of video information is generally stored in a plurality of memory storage locations corresponding to pixel locations on a display. The stored video information is generally referred to as a bit map. The video information representing a single screen of information on a display is called a picture. A goal of many video systems is to quickly and efficiently decode compressed video information to enable a motion video capability.

Standardization of recording media, devices and various aspects of data handling, such as video compression, is highly desirable for continued growth of this technology and its applications. One compression standard which has attained wide spread use for compressing and decompressing video information is the moving pictures expert group (MPEG) standard for video encoding and decoding. The MPEG standard is defined in International Standard ISO/IEC 11172-1, "Information Technology—Coding of moving pictures and associated audio for digital storage media at up to about 1.5 Mbit/s", Parts 1, 2 and 3, First edition 1993-08-01 which is hereby incorporated by reference in its entirety.

Pictures within the MPEG standard are divided into 16×16 pixel macroblocks. Each macroblock includes six 8×8 blocks: four luminance (Y) blocks, one chrominance red (Cr) block and one chrominance blue (Cb) block. The luminance blocks correspond to sets of 8×8 pixels on a display and control the brightness of respective pixels. The chrominance blocks to a large extent control the colors for sets of four pixels. For each set of four pixels on the display, there is a single Cr characteristic and a single Cb characteristic.

Figure 1:
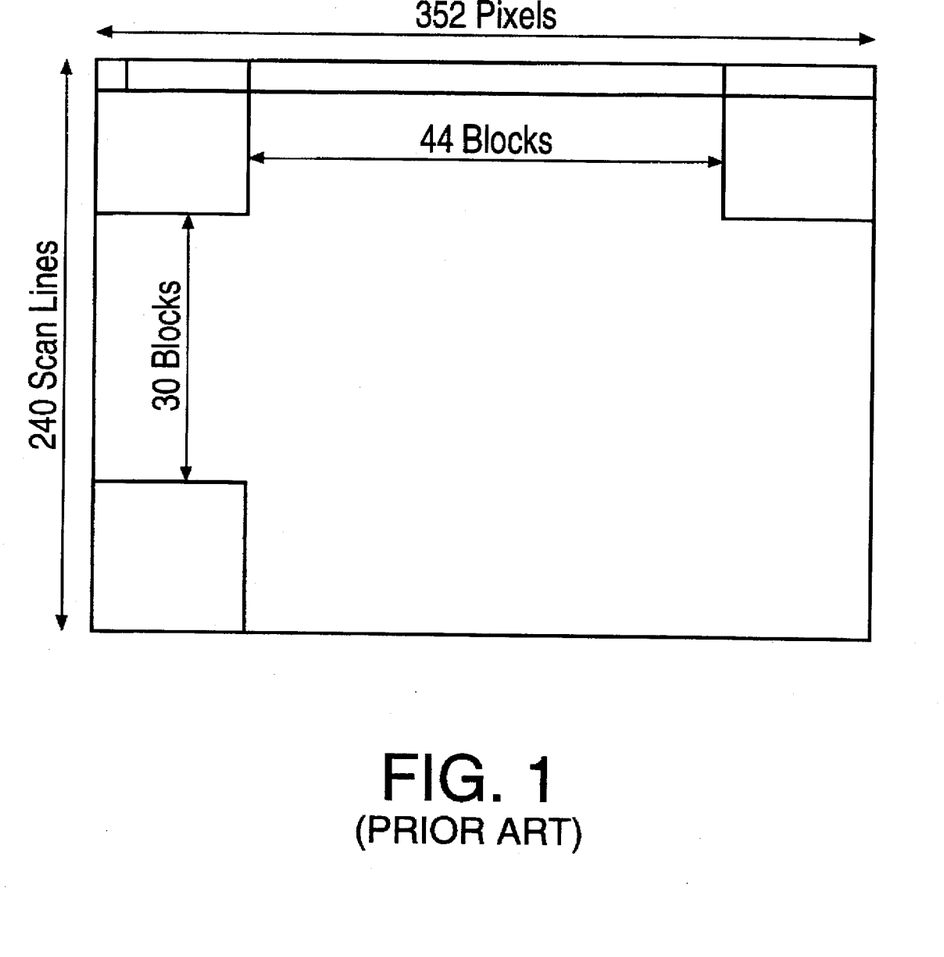
FIG. 1, labeled prior art, shows an arrangement of blocks of pixels on a display screen.

For example, referring to FIG. 1, labeled prior art, a picture presented by a typical display includes 240 lines of video information in which each line has 352 pixels. Accordingly, a picture includes 240×352=84,480 pixel locations. Under the MPEG standard, this picture of video includes 44 by 30 luminance blocks or 1320 blocks of luminance video information. Additionally, because each macroblock of information also includes two corresponding chrominance blocks, each picture of video information also includes 330 Cr blocks and 330 Cb blocks. Accordingly, each picture of video information requires 126,720 pixels or a total of 1,013,760 bits of bit mapped storage space for presentation on a display.

There are three types of pictures of video information which are defined by the MPEG standard, intra-pictures (I picture), forward predicted pictures (P picture) and bi-predicted pictures (B picture).

An I picture is encoded as a single image having no reference to any past or future picture. Each block of an I picture is encoded independently. Accordingly, when decoding an I picture, no motion processing is necessary. However, for the reasons discussed below, it is necessary to store and access I pictures for use in decoding other types of pictures.

A P picture is encoded relative to a past reference picture. A reference picture is a P or I picture. The past reference picture is the closest preceding reference picture. Each macroblock in a P picture can be encoded either as an I macroblock or as a P macroblock. A P macroblock is stored as a translated 16×16 area of a past reference picture plus an error term. To specify the location of the P macroblock, a motion vector (i.e., an indication of the relative position of the macroblock in the current picture to the position of the translated area in the past reference picture) is also encoded. When decoding a P macroblock, the 16×16 area from the reference picture is offset according to a motion vector. The decoding function accordingly includes motion compensation, which is performed on a macroblock, in combination with error (IDCT) terms, which are defined on a block by block basis.

A B picture is encoded relative to the past reference picture and a future reference picture. The future reference picture is the closest proceeding reference picture. Accordingly, the decoding of a B picture is similar to that of an P picture with the exception that a B picture motion vector may refer to areas in the future of the reference picture. For macroblocks that use both past and future reference pictures, the two 16×16 areas are averaged. The macroblocks from the reference pictures are offset according to motion vectors.

Pictures are coded using a discrete cosine transform (DCT) coding scheme which transforms pixels (or error terms) into a set of coefficients corresponding to amplitudes of specific cosine basis functions. The discrete cosine transform is applied to image compression to decorrelate picture data prior to quantization. The DCT coefficients are further coded using variable length coding. Variable length coding (VLC) is a statistical coding technique that assigns codewords to values to be encoded. Values of high frequency of occurrence are assigned short codewords, and those of infrequent occurrence are assigned long codewords. On the average, the more frequent shorter codewords dominate so that the code string is shorter than the original data.

For a video system to provide a motion video capability, compressed video information must be quickly and efficiently decoded. One aspect of the decoding process is inverse discrete cosine transformation (IDCT). A second aspect is a motion compensation operation. Both the IDCT operation and the motion compensation operation are computationally intensive operations. Over a wide range of processor capabilities and image characteristics, a condition sometimes arises in which the picture decoding operation overburdens a video system. Under this condition, video frames are commonly dropped or a lag in motion video results.

The above described scheme using I, P, and B frames and motion vectors is often referred to as motion compensation. The pixel error terms are coded via the discrete cosine transform (DCT), quantization, and variable-length coding (VLC). Performing an inverse discrete cosine transform function (IDCT) is one of the most computationally intensive operations in many common video decompression methods and which requires extensive processor resources. Furthermore, such an operation must be performed to decode every block in the compressed video information. The IDCT function severely burdens the system processor when implemented in a general purpose processor system since this operation requires many additions and multiplications for each term of the 64-term block.

Systems unable to keep up with the computational demands of such a decompression burden frequently drop entire frames to resynchronize with a real time clock signal also encoded in the video stream. Otherwise, video signals would become out of synchronization with audio signals, and/or the video playback would "slow down" compared to the "real" speed otherwise intended. This is sometimes observable as a momentary freeze of the picture in the video playback, followed by sudden discontinuities or jerkiness in the picture.

Handling the computational demands of decompression is only part of the task of a video display system. In addition, the system must gain access to the compressed data before the data can be processed for decompression. Data is read from a video storage device, typically a CD ROM device. A CD ROM is a slow device having single, double and quadruple speeds of 150, 300 and 600 KB/s, respectively, which are substantially slower than the processing speed of the system. Generally, a computer system does not utilize its processing capabilities to perform input/output operations on a bit-by-bit basis. Instead the processor of a computer system initiates an input/output operation and special input/output circuits perform data transfer operations. However, data is typically read into an input buffer and data from the input buffer is then decompressed. Reading of data from a video storage device into the input buffer and processing of data in the input buffer cannot be performed at the same time if only a single buffer is used to store the data bitstream read from a video storage device file. When only a single input buffer is used, data is read into the input buffer while video data decoding is blocked. After all bits in the buffer have been read, the decoder decompresses the video data. In this manner, input buffer is alternately filled then utilized for processing. Serial reading and processing operations slow down overall video data decoding.

What is needed is a video decompression system that reads and processes data concurrently.

SUMMARY OF THE INVENTION

In accordance with the present invention, a video decompression system utilizes multiple independent input buffers so that input/output operations and processing take place concurrently, nearly continuously and at a rate that is substantially equal to a selected maximum access rate of the storage device. Consequently, the data rate of the video decompression system is optimized with respect to the rate of data accessing.

In accordance with one embodiment of the present invention, a method of reading compressed video data from a video data storage device in a video processing system includes the steps of allocating a plurality of input data buffers, transferring compressed video data from the video data storage device to a first input data buffer of the plurality of input data buffers and decompressing compressed video data from a second input data buffer of the plurality of input data buffers concurrently with the data transferring step.

In accordance with a second embodiment of the present invention, a method of decompressing video data using a computer system includes the steps of defining a plurality of input data buffers and operating the computer system using a foreground processing and a background processing. The background processing includes the steps of assigning a read input data buffer from the plurality of input data buffers, reading compressed video data from a video data storage device into the read input data buffer and reassigning the read input data buffer to a process input data buffer when the read input data buffer is full. The foreground processing includes the step of decompressing compressed video data from a process input data buffer concurrently with the reading step.

Other embodiments of the present invention are similar to the first and second embodiments and also include the steps of selecting a number N of input data buffers for allocation by the allocating step and selecting a buffer length L of input data buffers for allocation by the allocating step. Some of these embodiments include the steps of determining a measure of processing performance of the computer and selecting the number N and the buffer length L of input data buffers which are dependent on the measure of processing performance. Some of these embodiments also include the steps of determining a measure of the character of the bitstream the compressed video data and selecting the number N and the buffer length L of input data buffers which are dependent on the measure of bitstream character. Some of these embodiments further include the steps of determining a measure of latency, access time and bandwidth of the video data storage device and selecting the number N and the buffer length L of input data buffers which are dependent on the measure of latency, access time and bandwidth. Some of these embodiments also include the steps of determining a measure of file input/output overhead for accessing data from the video data storage device and selecting the number N and the buffer length L of input data buffers which are dependent on the measure of file input/output overhead.

Usage of adaptively controlled input buffering as described above has several advantages. One advantage is that the data decompression operation becomes more efficient with the data accessing operation taking place concurrently with the data processing operation, thereby increasing the overall data handling rate of the system. Another advantage is that decoding processing becomes substantially asynchronous with respect to data reading so that the rates of data transfer and processing become generally independent. Independence of the data transfer and processing operations is advantageous in a system which performs tasks other than data handling so that data is available without delay when the system returns to a task utilizing data handling. It is advantageous that the processor in the video decompression system executes generally independently of the data transfer operation. When data is available for decoding, the processor may decode the data but may also perform other tasks which occasionally have a higher priority. When the processor does perform these other tasks, data continues to fill the input buffers so that delays due to unavailable data are avoided when the processor returns to the decoding task.

The above and other objects, features, and advantages of the present invention will become apparent from the following detailed description and drawings.

DETAILED DESCRIPTION

Figure 2:
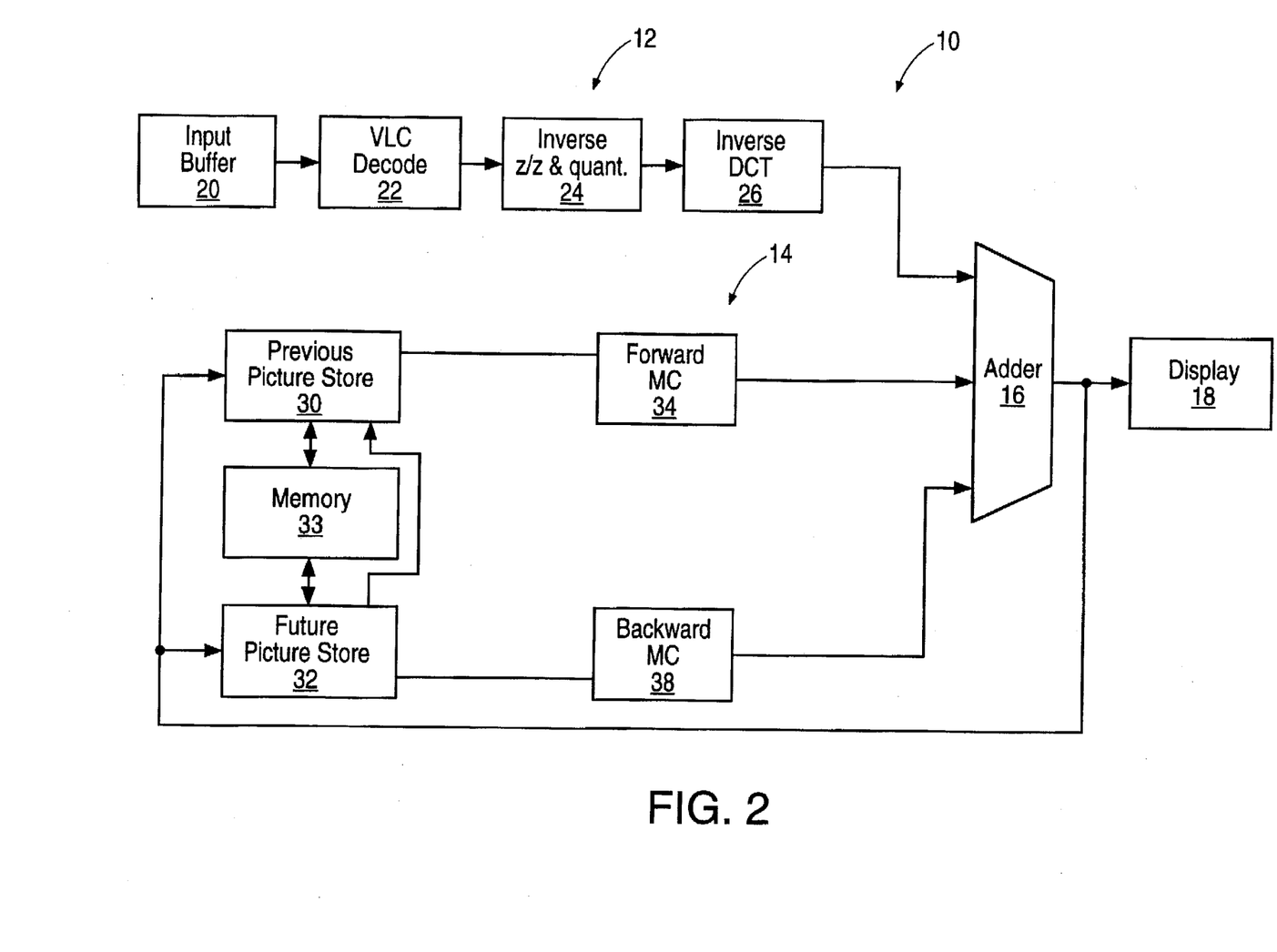
FIG. 2 shows a block diagram of a decoder video system in accordance with the present invention.

Referring to FIG. 2, a system for decompressing video information is shown. Video system 10 includes input stream decoding portion 12 incorporating an inverse discrete cosine transformation, motion decoding portion 14, adder 16 and display device 18. Input stream decoding portion 12 receives a stream of compressed video information and provides blocks of statically decompressed video information to adder 16. Motion decoding portion 14 receives motion information and provides motion compensation information to adder 16. Adder 16 receives the statically decompressed video information and the motion compensation information and provides decompressed video information to display 18.

Input stream decoding portion 12 includes input buffer 20, variable length coding (VLC) decoder 22, inverse zig-zag and quantizer circuit 24 and inverse digital cosine transform circuit 26. Motion decoding portion 14 includes previous picture store circuit 30, future picture store circuit 32, memory 33, forward motion compensation circuit 34 and backward motion compensation circuit 38. Display device 18 includes a picture buffer (not shown) which allows information provided by adder 16 to be rasterized prior to display by display device 18.

Input stream decoding portion 12 provides statically decompressed video signals to adder 16 on a block-by-block basis. Additionally, forward motion compensation circuit 34 and backward motion compensation circuit 38 of motion decoding portion 14 provide motion compensation signals to adder 16 on a macroblock by macroblock basis. Adder 16 provides a decompressed video signal to display 18 on a picture by picture basis. The decompressed video signal is also provided as a previous picture signal to previous picture store circuit 30 and future picture store circuit 32 (in the case of an I or P picture).

Figure 3:
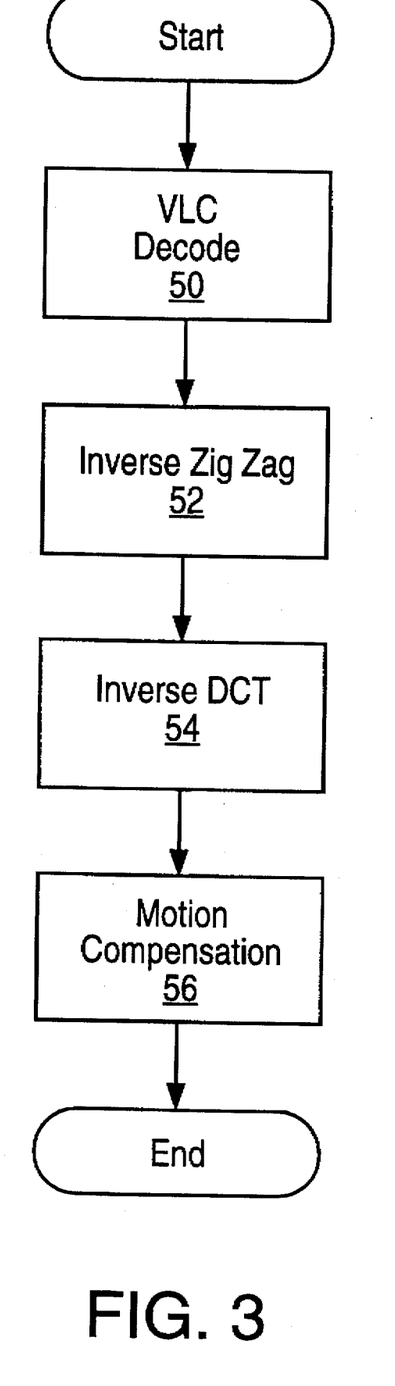
FIG. 3 shows a flow chart of the decoding of video information which is encoded using the MPEG standard.

Referring to FIGS. 2 and 3, in operation, input buffer 20 receives a compressed video signal in the form of a bitstream from a video signal source such as a CD ROM (not shown); the compressed video signal is provided as a stream of compressed video information. Input buffer 20 buffers this compressed video signal to compensate for variations in the speed which the signal is provided by the video source.

Figure 4:
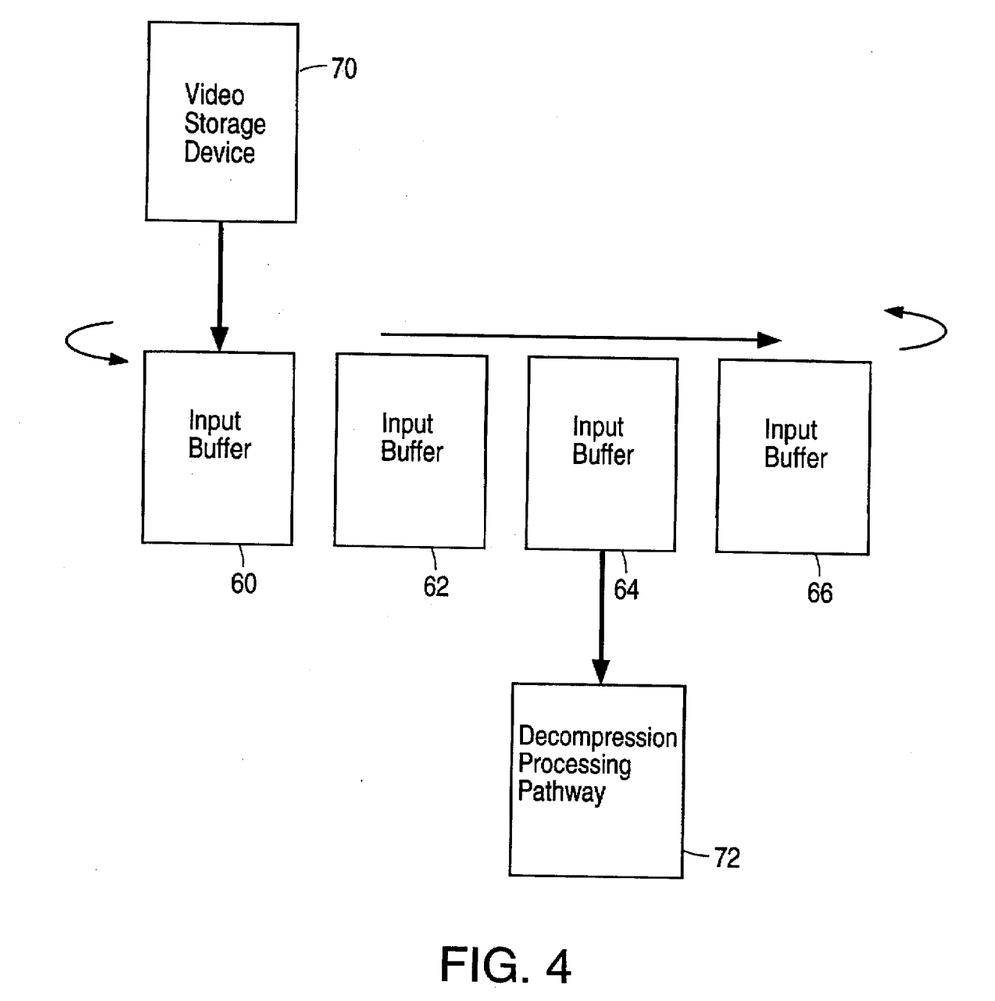
FIG. 4 is a block diagram which illustrates an allocation of input data buffers in accordance with the disclosed method.

Multiple input buffers 20 are allocated in the video system 10 so that video bitstream data is read from the video signal source into one buffer while another buffer is used to process the compressed video signal bitstream. Referring to FIG. 4, an example of an allocation of video input buffers is shown which includes four allocated input buffers 60, 62, 64 and 66. Under one typical condition, the input buffer 60 is currently filled from a video storage device 70 while video bitstream data in input buffer 64 is processed by a decompression processing pathway 72. In this example, the video storage device 70 transfers data to the input buffers in the order of buffers 60, 62, 64, 66 and recycling to buffer 60 and the decompression processing pathway 72 also processes video bitstream data in the order of input buffers 60, 62, 64, 66 and recycling to buffer 60. In this example, transferring data to the input buffers is one buffer ahead of the processing of input data with input buffer 62 being filled and awaiting processing and input buffer 66 being processed and awaiting filling. The number of input buffers under various conditions and circumstances is greater or lesser than the four buffers shown in this example. The minimum number of input buffers is two. The number of input buffers and the length of the buffers is set adaptively as a function, for example, of processor capabilities, available system memory, bitstream characteristics, drive latency and access time, and file I/O overhead.

Referring again to FIGS. 2 and 3, the input bitstream is accumulated in the input buffer 20 until the bitstream data is to be utilized. This buffered compressed video signal is provided to VLC decoder 22 which decodes the variable length coded portion of the compressed signal at VLC decoding step 50 to provided a variable length decoded signal.

The variable length decoded signal is provided to inverse zig-zag and quantizer circuit 24 which, at inverse zig-zag and quantization step 52, decodes the variable length coded signal to provide a zig-zag decoded signal. Inverse zig-zag and quantizer circuit 24 produces actual DCT coefficients using a preset quantization step size. When a signal is encoded, data is run-length encoded in zig-zag ordering across an image so that compression is optimized. In general, most of the energy in an image is concentrated at the low frequency coefficients, which are conventionally written in the upper left corner of the transformed matrix, Therefore, image data which has been converted to a frequency representation typically has larger coefficients at lower spatial frequencies, clustered at the upper left corner of a frequency image block. Coefficients typically decrease along rays extending from the zero-frequency, or DC, term to higher spatial frequency terms. A block of data is compressed by discrete cosine transform (DCT) coefficient quantization. Most of the information in a block is contained in the lower frequency coefficients. Quantization serves to remove small coefficients—coefficients that are smaller than a quantization step. Higher frequency coefficients have a larger quantization step. Zig-zag ordering is used to reorder the quantized discrete cosine transform (DCT) block of coefficients so that non-zero coefficients are transmitted first, thereby increasing transmission efficiency. The inverse zig-zag and quantization step 52 compensates for the fact that, while a compressed video signal is compressed in a zig-zag run length code fashion, the zig-zag decoded signal is provided to inverse DCT circuit 26 as sequential blocks of video information. Accordingly, this zig-zag decoded signal provides blocks which are in a suitable order for raster scanning across display 18.

When a signal is encoded, an image block is first transformed from the spatial domain to the frequency domain using the Discrete Cosine Transform (DCT), which separates the signal into independent frequency bands. Most of the frequency information is in the upper left corner of the resulting block. The zig-zag decoded signal is applied to inverse DCT circuit 26 to convert the frequency domain image into the spatial domain. The inverse DCT circuit 26, at inverse DCT step 54, performs an inverse digital cosine transform on the zig-zag decoded video signal on a block-by-block basis to provide a decompressed video signal. This decompressed video signal corresponds to either error terms for P or B-coded macroblocks or pixels for I-coded macroblocks.

The decompressed signal is provided to adder 16 which, if the signal does not include any motion information (i.e., I pictures) provides this signal to display 18. However, for video signals which include motion information (i.e., B pictures and P pictures), adder 16 uses the forward motion compensation and backward motion compensation outputs from motion decode portion 19 to generate the video information which is provided to display 18 at motion compensation step 56. More specifically, forward motion vectors are used to locate information in previous picture store circuit 30 and backward motion vectors are used to locate information in future picture store circuit 32 and this information is added to the output provided by inverse DCT circuit 26.

VLC decoder 22 decodes a sequence of pictures in the following manner. VLC decoder 22 first decodes the header of a first picture, called picture 0, and determines that it is an I-picture. VLC decoder 22 produces quantized coefficients corresponding to the quantized DCT coefficients. These are assembled for each 8 by 8 block of pixels in the image by inverse zig-zag scanning. VLC decoder 22 decodes the header of the next picture, picture 3, and determines that it is a P-picture. For each inter-coded macroblock, the VLC decoder 22 decodes motion vectors giving the displacement from the stored previous picture, and quantized coefficients corresponding to the quantized DCT coefficients. The quantized DCT coefficients are error terms in the form of a difference block. For an intra-coded macroblock, all six blocks include IDCT values. For inter-coded or predicted macroblocks, not all six blocks include IDCT error terms. These quantized coefficients are inverse quantized to produce actual DCT coefficients. The coefficients are transformed into pixel difference values and added to the predicted block which are generated by applying the motion vectors to macroblocks in the stored previous picture. The resultant macroblock is displayed on display 18. This picture is not displayed until B-pictures 1 and 2 have been received, decoded, and displayed. VLC decoder 22 decodes the header of the next picture, picture 1, and determines that it is a B-picture. For each intercoded macroblock, the VLC decoder decodes motion vectors giving the displacement from the stored previous or future pictures or both, and quantized coefficients corresponding to the quantized DCT coefficients of the difference block. These quantized coefficients are inverse quantized to produce actual DCT coefficients. The coefficients are inverse transformed into difference pixel values and added to a predicted macroblock produced by applying the motion vectors to the stored pictures. The resultant macroblock is stored in display 18. The macroblock is displayed at a suitable time.

During picture coding, a discrete cosine transform computation is performed on the 8×8 pixel blocks to decorrelate picture data before quantization in the process of image compression. DCT coefficients resulting from this decorrelation operation include many coefficients which are equal to zero. During the decoding process, few nonzero quantized coefficients are received so the input signal to the inverse DCT circuit 26 is generally a sparse data block.

Figure 5:
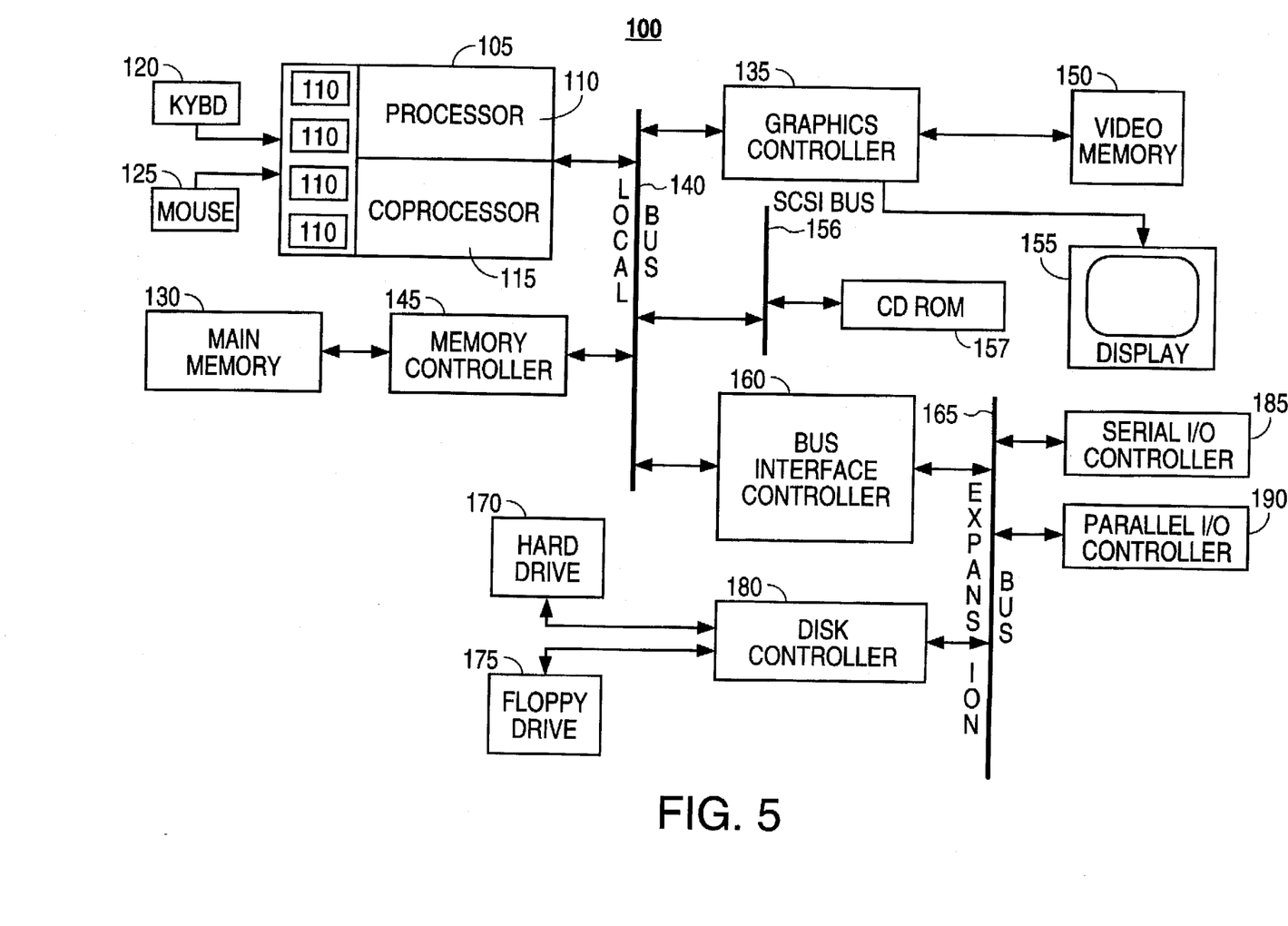
FIG. 5 is a block diagram of a computer on which the disclosed method can be implemented.

FIG. 5 shows a typical computer apparatus 100 upon which the disclosed method of adaptively performing motion compensation is implemented. While the computer apparatus 100 of FIG. 5 is a general purpose computer, custom hardware can also be employed for implementing the disclosed motion compensation method.

Computer apparatus 100 includes a microprocessor 105 having a processor 110 for processing integer instructions and a coprocessor 115 for processing floating point instructions. In this particular embodiment, microprocessor 105 is an X86 microprocessor, although other types of microprocessors such as RISC microprocessors can also be used. Microprocessor 105 includes registers 110, which are 32-bit registers having four 8-bit segments in this particular embodiment. A keyboard 120 and mouse pointing device 125 are connected to microprocessor 105 to provide input signals to the microprocessor 105. Main memory 130 and a graphics controller 135 reside on a common local bus 140 which is connected to microprocessor 105. More specifically, a memory controller 145 connects main memory 130 to the local bus 140. A video memory 150 and display 155 are connected to graphics controller 135 to enable graphics and video images to be transmitted to display 155.

The local bus 140 is also connected to a small computer system interface (SCSI) bus 156, an industry standard hardware bus. The SCSI bus 156 is connected to a hardware CD ROM drive 157. The CD ROM drive 157 serves as a video data storage device in the computer apparatus 100. Utilization of an SCSI interface is described for illustrative purposes, other types of interfaces which are common in the art of computer systems may also be implemented. For example, a CD ROM drive may also be implemented as an integrated device electronics (IDE) drive, a type of drive interface in which controller electronics reside on the drive, eliminating usage of a separate adapter card. Other types of hardware, such as a fast driver array (not shown), are utilized in other embodiments of the computer apparatus 100.

A bus interface controller 160 connects local bus 140 to an expansion bus 165. Expansion bus 165 is a Peripheral Component Interconnect (PCI) bus, an Industry Standard Architecture (ISA) bus, or other bus architecture, if desired. A hard drive 170 and a floppy drive 175 are connected by a disk controller 180 to expansion bus 165 as shown. A serial I/O controller 185 and a parallel I/O controller 190 are connected to expansion bus 165 to permit the connection of external serial and parallel devices to computer 100.

Figure 6:
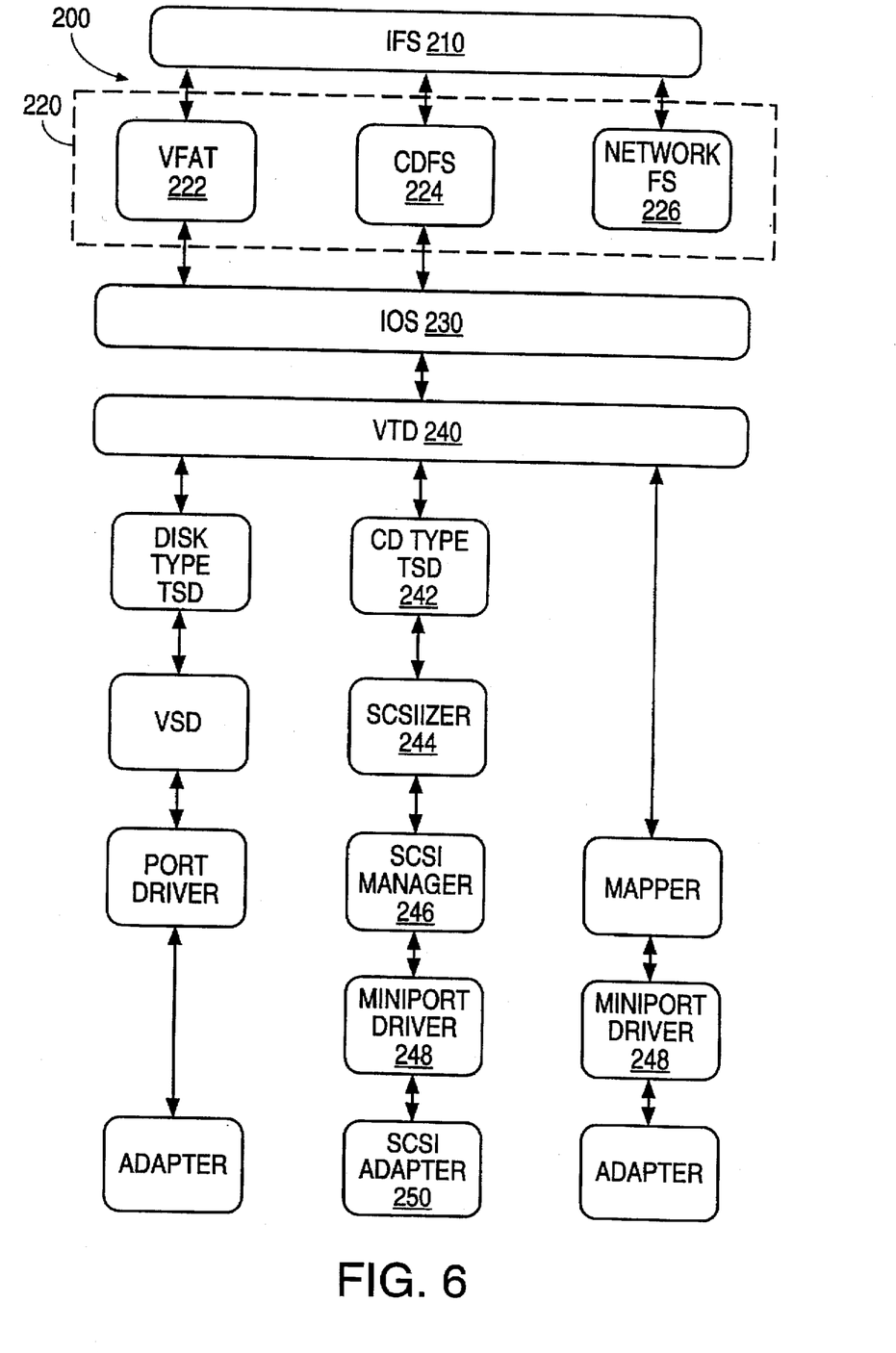
FIG. 6 is a block diagram of a filesystem architecture within which the disclosed method can be implemented.

FIG. 6 illustrates an example of a file system of a computer operating system within which an embodiment of the described method of reading compressed video data from a video data storage device in a video processing system is implemented. The file system is defined according the specifications of the Microsoft Windows 95®operating system. The file system includes a plurality of drivers, called VxDs. A VxD is defined as a "virtual anything driver", a low-level software component that manages a single resource, such as a CD ROM or other mass storage device, on behalf of possibly many concurrent paths (threads) of execution within a process. This enables applications running separate MS-DOS virtual machines to use a single resource.

A filesystem architecture 200 is shown in FIG. 6. An installable filesystem manager (IFS) 210 is the highest level element of the filesystem architecture 200 and is a single VxD that furnishes an interface between application requests and a specific filesystem as requests are made to the specific filesystem by application functions. The filesystem manager IFS 210 accepts dynamically-linked API (Application Program Interface) calls, for example, and transforms the API requests into calls to the next layer, the filesystem layer 220. The filesystem layer 220 includes a plurality of filesystem drivers (FSDs), specifically a VFAT filesystem 222, a CDFS filesystem 224 and an optional network filesystem 226. The IFS 210 is the only module that calls a filesystem driver (FSD). Applications do not call an FSD directly.

VFAT filesystem 222 is a protected mode implementation of a file access table (FAT) filesystem. The CDFS 224, in the filesystem layer 220, is a file system driver (FSD) which implements a protected mode ISO 9660-compliant CD ROM filesystem. VFAT filesystem 222 and CDFS filesystem 224 are 32-bit modules which are written as reentrant code.

The VFAT filesystem 222 and the CDFS filesystem 224 interface with an I/O subsystem (IOS) 230. The IOS 230 is the highest level layer of a block device subsystem. IOS 230 is permanently resident in memory and supplies various services to other filesystem components, including request routing and time-out notification services.

An optional volume tracking driver (VTD) 240 in a layer below the IOS 230 layer manages removable devices, for example, a floppy disk device. A type specific driver (TSD), such as a CD type specific driver 242, in a layer below the VTD 240 layer, manages devices of a particular type. A TSD 242 validates requests for the controlled device type and converts input parameters from logical to physical form. Related device types are related more on a basis of specific logical types, for example compressed volumes, than to devices of a specific hardware type.

A SCSIizer 244 interfaces to a TSD 242 and translates I/O requests into SCSI format command blocks. SCSI format (small computer system interface) is an industry standard hardware bus. Typically one SCSIizer module is utilized for each SCSI device type, for example CD ROMs. An SCSI manager 246 interfaces to the SCSIizer 244 and allows usage of various miniport drivers 248 by translating information between the miniport drivers 248 and upper layers of the filesystem 200. A miniport driver 248 is specific to a particular SCSI device (not shown) and performs the function of a port driver, but does so for a SCSI adapter 250. The miniport driver 248 translates I/O requests into hardware commands.

In operation, the IFS manager 210 accepts filesystem API calls, converts the calls to appropriate IFS interface calls, then passes the request to the appropriate module in the filesystem layer 220. The selected module in the filesystem layer 220, for example the CDFS filesystem 224, interprets the function call according to suitable private semantics.

A single data structure called an IOREQ structure serves as the interface between the IFS manager 210 and an FSD. The IOREQ structure is a large data object of approximately 100 bytes which contains many defined fields. Typically only some of the defined fields are used in a call from the IFS manager 210 to the FSD. Each call to a particular filesystem code in a particular FSD from an application causes the IFS manager 210 to fill an IOREQ structure element, thereby passing data relating to the element to the selected FSD. The IFS manager 210 passes a pointer to an IOREQ structure rather than an entire data object. The FSD directly modifies fields in the IOREQ structure to return results to the IFS manager 210. Before returning to the application from which the call originated, the IFS manager 210 examines the IOREQ structure and extracts both the relevant information that is held internal to the IFS manager 210 and the applicable parameters to be returned to the application. Table I illustrates the format of the IOREQ structure, as follows:

```
struct ioreq {
    unsigned int    ir_length;    //length of user
buffer(eCX)
    unsigned char   ir_flags;     //misc. status flags (AL)
    uid_t           ir_user;      //user ID for this request
```

-continued
```
    sfn_t           ir_sfn;       //system file number of
                                  // file handle
    pid_t           ir_pid;       //process ID of requesting
                                  // task
    path_t          ir_ppath;     //unicode pathname
    aux_t           ir_aux1;      //secondary user data
buffer
                                  // (DS:eDX)
    ubuffer_t       ir_data;      //pointer to user data
buffer
    unsigned short  ir_options;   //request handling options
    short           ir_error;     //error code (0 if OK)
    rh_t            ir_rh;        //resource handle
    fh_t            ir_fh;        //file (or find) handle
    pos_t           ir_pos;       //file position for request
    aux_t           ir_aux2;      //misc. extra API
parameters
    aux_t           ir_aux3;      //misc. extra API
parameters
    pevent          ir_pev;       //ptr to IFSMgr event for
                                  // async requests
    fsdwork_t       ir_fsd;       //provider work space
}; //ioreq
```

A filesystem such as the CDFS filesystem 224 is a single VxD which implements particular selected semantics. The structure of the entire CDFS filesystem layout is contained within the code of the CDFS filesystem 224. The IFS manager 210 simply interacts with a filesystem on the basis of handles, program data objects that supply access to an allocated resource, while lower layers of the filesystem mostly interact on the basis of byte offsets and counts. The IFS manager 210 interacts with the CDFS filesystem 224 by calling various entry points. These entry points include a close opened file entry point (FS_CloseFile()), a call directory operations entry point (FS_Dir()), a set and retrieve file and filesystem information entry point (FS_FileAttributes()), a perform file positioning operations entry point (FS_FileSeek()), a get information about disk format and free space entry point (FS_GetDiskInfo()), a call initial entry point for local filesystems entry point (FS_MountVolume()), a file open and create functions entry point (FS_OpenFile()), a call input operations entry point (FS_ReadFile()), and a call file output operations entry point (FS_WriteFile()), for example.

The I/O subsystem (IOS) 230 loads device drivers, initializes specific driver modules and manages all lower-level filesystem modules. IOS 230 uses an asynchronous event entry point of a driver during initialization to set various data structure elements causing the driver to perform private setup operations, so that the driver takes control of operations from the IOS 230 at defined times of the initialization process. Furthermore, IOS 230 furnishes services to allow file system drivers (FSDs) to initiate device-specific requests. IOS 230 and device driver layers utilize a large number of interlinked control blocks and a standard VxD service interface to implement an interaction technique called a calldown chain. An FSD prepares a request for a device by initializing a control block and passing the block to an IOS_SendCommand() service. This control block is called an I/O packet or an IOP. IOS 230 uses the IOP to control passage of the device request down and back up the driver hierarchy. IOS 230 operates either as a managing entity when specific device requests are in progress, or as a supplier of a plurality of centralized services that any device driver can call. Three basic VxD services performed by the IOS 230 are: (1) IOS_Register()—A service used by device drivers to register their presence in the system, a requirement for IOS interaction with the driver. (2) IOS_SendCommand ( )—A service for initializing specific device actions such as data transfers and disk ejection. (3) IOS_Requestor_Service( )—A service furnishing a few individual functions such as functions for obtaining information about hardware characteristics. In addition, multiple various services, called IOS service requests, are utilized by drivers to control interactions with the IOS 230.

For each active volume, for example a CD ROM partition or a floppy disk, IOS 230 maintains a data structure called a volume request packet (VRP). An application calls an IOS_Request_Service( ) of the IOS 230 and specifies the IRS_Get_VRP( ) function to access the address of the VRP for a particular volume. The VRP includes data structures for holding the address of the entry point in IOS 230 that an FSD uses to initialize I/O requests, and the size of the IOP utilized for requesting the volume. An FSD initiates an I/O request by allocating an IOP of the correct type and size, setting the IOR structure and passing the IOP to IOS 230.

IOS 230 uses an asynchronous events notification to interact with device driver modules outside the flow of normal I/O requests up and down the driver hierarchy. IOS 230 signals an asynchronous event by calling the asynchronous entry point of a driver, passing an asynchronous event packet (AEP) to the driver. An AEP has a standard header which specifies the specific asynchronous function called and the associated device data block (DDB). The AEP also has a field that is used by the driver to set a completion code. Asynchronous events which may be signalled include an initialize the driver event (AEP_Initialize), a configure the physical device and associated DCB event (AEP_Config_DCB), an IOP timeout counter termination event (AEP_IOP_Timeout), and a configure the logical device event (AEP_Config_Logical).

Normal execution for a driver includes processing and queuing of IOPs which are passed to the driver through a standard I/O request function. For actual device I/O operations, if the device is not busy, the driver starts the operation. The driver also responds to timeout events signalled by IOS 230.

Figure 7:
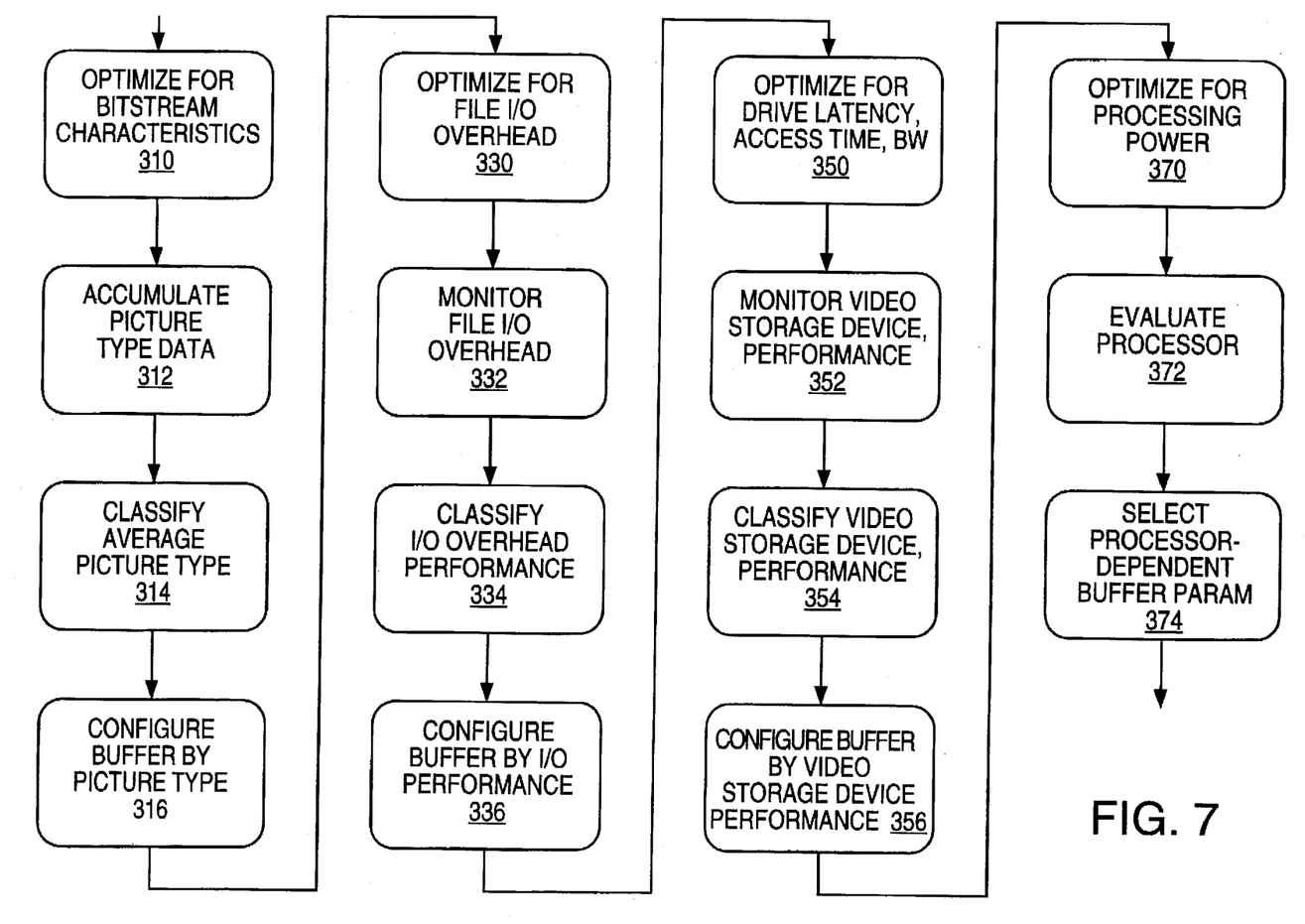
FIG. 7 illustrates a flow chart of a routine for adaptively setting the number of buffers allocated for decoding and the length of the data buffers.

FIG. 7 illustrates a flow chart of a routine 300 for adaptively setting the number of buffers allocated for decoding and the length of the data buffers. Optimize for bitstream characteristics process 310 monitors compressed video data to identify particular characteristics that are pertinent for efficiently buffering data. For example, the amount of data compression varies between different pictures so that some pictures are encoded in a small number of bits and other pictures are encoded in a much larger number of bits. The content of a sequence of pictures dictates the compression ratio that is achieved. A single talking head against a background of a white wall has inherently less information than a full motion action picture sequence of an automobile chase in San Francisco, for example. As a result, the video compression ratio varies as a function of the amount of information to be conveyed.

Optimize for bitstream characteristics process 310 accesses decoding results from the VLC decoder. The VLC decoder decodes the headers of each picture and determines whether the picture is an I-picture, a P-picture or a B-picture. I-pictures typically have more than twice the information content of a P-picture, and thus have a compression ratio that is less than half the compression ratio of a P-picture. B-pictures contain very little information and have a compression ratio roughly fifteen times that of an I-picture. Accumulate picture type data process 312 accumulates relative average numbers of the different types. For video sequences having a high proportion of I-pictures, classify average picture type process 314 classifies a sequence of pictures as a low compression ratio sequence. For video sequences having a high proportion of B-pictures, a sequence of pictures is assigned a high compression ratio. Configure buffer by picture type process 316 sets the number of input buffers N and the buffer length L according to the compression ratio in a predetermined, preprogrammed manner. For example, a low compression ratio sequence typically is best handled by dynamically increasing both the number of input buffers N and the size of the input buffers L since more data is available for the processor to handle.

In other embodiments, optimize for bitstream characteristics processes 310 analyze the bitstream data in more detail, for example by monitoring motion vector values and the values of DCT coefficients. Generally, larger motion vector values and more non-zero DCT coefficients indicate a greater processing amount. More input buffers having a larger size are typically utilized for a larger processing amount.

Optimize for file I/O overhead process 330 monitors the amount of time utilized by the operating system in administrative overhead for an I/O request. Computer-based video systems perform a number of various tasks. In some circumstances many tasks are run concurrently while in other circumstances, few tasks are run. In some circumstances, the operating system is burdened by many I/O requests so that a particular request may be delayed. Optimize for file I/O overhead process 330 dynamically tests operating system I/O timing performance and adjusts the number and length of input data buffers accordingly.

In one embodiment, operating system I/O timing performance is tested by monitoring the timing of the I/O packets (IOPs) which are used to read compressed video data from the video storage device. In the Windows 95® operating system, a file system driver (FSD) prepares a read request for the video storage device, for example a CD ROM, by initializing and passing an IOP to an IOS_SendCommand( ) service. The IOP is a data block which includes a timeout count. The timeout count is set so that the occurrence of an IOP timeout counter termination event (AEP_IOP_Timeout) indicates that the operating system may not be adequately serving the I/O requirements of the video decompression path. When an IOP timeout counter termination event (AEP_IOP_Timeout) occurs, the event is logged. Monitor file I/O overhead process 332 reads the event log to measure operating system I/O performance. Classify I/O overhead performance process 334 classifies the I/O performance based on the number of timeouts in a selected time interval or a selected number of I/O requests. Configure buffer by I/O performance process 336 sets the number of input buffers N and the buffer length L according to the classified I/O performance. In general, if overhead is low, many small buffers are utilized. For high I/O overhead, fewer large buffers are used so that much data is read for a given amount of administrative handling. The IOP timeout count is updated in configure buffer by I/O performance process 336 to correlate timing to buffer characteristics. For example, if a termination event (AEP_IOP_Timeout) occurs rarely or never, the IOP timeout count is decreased to furnish some information relating to I/O overhead.

Optimize for drive latency, access time and bandwidth process 350 monitors the performance of the video storage device to determine the amount of time utilized for reading bitstream data into the input buffer. Latency is the time interval between an instant in time when a processor initiates a call for data and the instant of the actual start of transfer of the data. Access time is the time interval between the instant at which a call for data is initiated and the instant at which the delivery of data is completed. Thus access time is the latency plus the time for data transmission.

In various computer-based video systems, video data storage systems may be incorporated having widely different performance characteristics. For example, video data may be read from a very fast driver array that produces a large amount of data in a short time or data may be read from a slow CD ROM device which operates at low data rates.

In one embodiment, video storage device driver timing performance is tested by monitoring the time interval between issuance of a command to a hardware driver and completion of the data transfer. According, a video storage device driver routine includes an instruction that reads and stores a timing indication, such as a realtime clock register, as a command is written to a hardware device register to initiate a data buffer read operation. In addition, the video storage device driver routine includes an instruction that reads the timing indication at the completion of the data transfer, finds the difference between the two timing indications and stores the time difference. One example of a video storage device driver routine is a miniport driver which is specific to a SCSI CD ROM driver. Monitor video storage device performance process 352 reads the time difference to measure device performance. Classify video storage device performance process 354 classifies device performance based on the time difference signal or on multiple time difference signals accumulated over time or over a number of I/O requests. Configure buffer by video storage device performance process 356 sets the number of input buffers N and the buffer length L according to the classified video storage device performance. In general, if a video storage device is slow, small input buffers are utilized. Reading from a very fast driver array that produces a large amount of data in a short time is best served by a large buffer length L on the input buffer.

Optimize for processing power process 370 evaluates and classifies a microprocessor which controls the video processing pathway to determine the performance capability of the microprocessor. Optimize for processing power process 370 includes an evaluate processor routine 372 and a select processor-dependent buffer parameters routine 374. The evaluate processor routine 372 determines the hardware and software configurations of the computer system upon which the video system is operating. The operating system is typically a multi-media operating system, for example, Apple® QuickTime or Microsoft® Video for Windows running on a computer such as a personal computer with a general-purpose microprocessor. Typical microprocessors include x86 microprocessors such as a Am386 and Am486 series microprocessors manufactured by Advanced Micro Devices, Inc., Santa Clara, Calif. Other microprocessors include Am29000 and Am29050 RISC-type microprocessors. Evaluate processor routine 372 not only determines capabilities of the processor but also evaluates capabilities of special-purpose processors operating in conjunction with the microprocessor including video processors and floating point processors. A microprocessor type designation is read from special registers. Other processors are identified by reading of special registers. Furthermore, evaluate processor routine 372 determines the amount of system memory that is available for data handling.

After evaluation of a processor, select processor-dependent buffer parameters routine 374 designates the number N of input buffers and the length L of the input buffers. These parameters are selected in accordance with the designated processor, hardware and software configuration set in the evaluate processor routine 372 and the amount of system memory that is available for data handling. Select processor-dependent parameters routine 374 typically accesses a memory structure such as a table to read these parameters using an indication of the configuration as an index into the table.

The description of certain embodiments of this invention is intended to be illustrative and not limiting. Numerous other embodiments will be apparent to those skilled in the art, all of which are included within the broad scope of this invention. For example, the embodiments described herein are computer-based implementations. Electronic circuit based embodiments which perform the same function are expressly included within the scope of the claims. Furthermore, the disclosed method is a computer-based implementation using the Microsoft Windows 95® operating system. Other computer-based implementations utilize other operating systems. In addition, in the disclosed implementation of the method for adaptively setting input buffer parameters, parameters are set as a function of processor capabilities, available system memory, bitstream characteristics, drive latency and access time, and file I/O overhead. Other implementations utilize analysis of other system characteristics such as the number of asynchronous requests which are pending at one time.

What is claimed is:

1. A method of buffering compressed video data from a video storage device in a video processing system comprising the steps of:

selecting a number N of input data buffers;

selecting a buffer length L of input data buffers;

allocating a selected plurality N of input data buffers having the selected buffer length L;

transferring compressed video data from the video data storage device to a first input data buffer of the plurality of input data buffers;

decompressing compressed video data from a second input data buffer of the plurality of input data buffers concurrently with the data transferring step;

determining a measure of latency, access time and bandwidth of the video data storage device; and selecting the number N and the buffer length L of input data buffers which are dependent on the measure of latency, access time and bandwidth;

wherein: the step of determining a measure of latency, access time and bandwidth of the video data storage device further includes the steps of:

monitoring a time interval between issuance of a command to a hardware driver and completion of the data transfer; and comparing the time interval to a predetermined standard; and the step of selecting the number N and the buffer length L of input buffers includes the steps of:

selecting a larger buffer length L of input buffers for a smaller time interval; and selecting a smaller buffer length L of input buffers for a longer time interval.

2. A method according to claim 1 further comprising the steps of:

terminating the compressed video data transferring step when the first input data buffer is full; and transferring compressed video data from the video data storage device to an input data buffer different from the first input data buffer.

3. A method according to claim 1 further comprising the steps of:

terminating the compressed video data decompressing step when the second input data buffer data is fully decompressed; and decompressing compressed video data from an input data buffer different from the second input data buffer.

4. A method according to claim 1 wherein the method is implemented in a computer, further comprising the steps of:

determining a measure of processing performance of the computer; and selecting the number N and the buffer length L of input data buffers which are dependent on the measure of processing performance in combination with the measure of latency, access time and bandwidth.

5. A method according to claim 1 further comprising the steps of:

determining a measure of a character of the bitstream of the compressed video data; and selecting the number N and the buffer length L of input data buffers which are dependent on the measure of the character of the bitstream.

6. A method according to claim 5 wherein:

the step of determining a measure of the character of the bitstream further includes the steps of:

determining a relative proportion of I-pictures, P-pictures and B-pictures in a sequence of pictures; and comparing the relative proportion to a predetermined standard; and the step of selecting the number N and the buffer length L of input buffers includes the step of:

selecting a larger number N and a larger buffer length L of input buffers for a larger proportion of I-pictures in the sequence of pictures.

7. A method according to claim 5 wherein:

the step of determining a measure of the character of the bitstream further includes the steps of:

determining a relative proportion of nonzero and zero-valued DCT coefficients in a sequence of pictures; and comparing the relative proportion of nonzero DCT coefficients to a predetermined standard; and the step of selecting the number N and the buffer length L of input buffers includes the step of:

selecting a larger number N and a larger buffer length L of input buffers for a larger proportion of nonzero DCT coefficients in the sequence of pictures.

8. A method of buffering compressed video data from a video storage device in a video processing system comprising the steps of:

selecting a number N of input data buffers;

selecting a buffer length L of input data buffers;

allocating a selected plurality N of input data buffers having the selected length L;

transferring compressed video data from the video data storage device to a first input data buffer of the plurality of input data buffers;

decompressing compressed video data from a second input data buffer of the plurality of input data buffers concurrently with the data transferring step;

determining a measure of file input/output overhead for accessing data from the video data storage device; and selecting the number N and the buffer length L of input data buffers which are dependent on the measure of file input/output overhead.

9. A method according to claim 8 wherein:

the step of determining a measure of file input/output overhead further includes the steps of:

monitoring timing of input/output operations; and comparing the timing of input/output operations to a predetermined standard; and the step of selecting the number N and the buffer length L of input buffers includes the steps of:

selecting a larger number N and a smaller buffer length L of input buffers for a faster timing of input/output operations; and selecting a smaller number N and a larger buffer length L of input buffers for a slower timing of input/output operations.

10. A method according to claim 8 further comprising the steps of:

terminating the compressed video data transferring step when the first input data buffer is full; and transferring compressed video data from the video data storage device to an input data buffer different from the first input data buffer.

11. A method according to claim 8 further comprising the steps of:

terminating the compressed video data decompressing step when the second input data buffer data is fully decompressed; and decompressing compressed video data from an input data buffer different from the second input data buffer.

12. A method according to claim 8 wherein the method is implemented in a computer, further comprising the steps of:

determining a measure of processing performance of the computer; and selecting the number N and the buffer length L of input data buffers which are dependent on the measure of processing performance in combination with the measure of latency, access time and bandwidth.

13. A method according to claim 8 further comprising the steps of:

determining a measure of a character of the bitstream of the compressed video data; and selecting the number N and the buffer length L of input data buffers which are dependent on the measure of the character of the bitstream.

14. A method according to claim 13 wherein:

the step of determining a measure of the character of the bitstream further includes the steps of:

determining a relative proportion of I-pictures, P-pictures and B-pictures in a sequence of pictures; and comparing the relative proportion to a predetermined standard; and the step of selecting the number N and the buffer length L of input buffers includes the step of:

selecting a larger number N and a larger buffer length L of input buffers for a larger proportion of I-pictures in the sequence of pictures.

15. A method according to claim 13 wherein:

the step of determining a measure of the character of the bitstream further includes the steps of:

determining a relative proportion of nonzero and zero-valued DCT coefficients in a sequence of pictures; and comparing the relative proportion of nonzero DCT coefficients to a predetermined standard; and the step of selecting the number N and the buffer length L of input buffers includes the step of:

selecting a larger number N and a larger buffer length L of input buffers for a larger proportion of nonzero DCT coefficients in the sequence of pictures.

* * * * *